United States Patent
Thompson et al.

(10) Patent No.: US 7,247,667 B2
(45) Date of Patent: Jul. 24, 2007

(54) PARTICLE CONTAINING SOLID SURFACE MATERIAL

(75) Inventors: Jennifer L. Thompson, Depew, NY (US); Lorraine A. Townsend, East Amherst, NY (US); Robert Thomas Young, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 303 days.

(21) Appl. No.: 10/806,583

(22) Filed: Mar. 23, 2004

(65) Prior Publication Data
US 2005/0215683 A1 Sep. 29, 2005

(51) Int. Cl.
*C08L 5/092* (2006.01)
*C08F 2/44* (2006.01)

(52) U.S. Cl. .............. 524/294; 524/391; 524/560; 524/437; 524/436; 524/539; 524/853; 524/773; 523/171

(58) Field of Classification Search .............. 524/560, 524/321, 853, 773, 294, 394, 437; 525/437, 525/539; 523/171
See application file for complete search history.

(56) References Cited

U.S. PATENT DOCUMENTS

| | | | |
|---|---|---|---|
| 3,865,788 A | 2/1975 | Christie et al. | |
| 4,085,246 A | 4/1978 | Buser et al. | |
| 4,115,479 A * | 9/1978 | Daidone | 525/193 |
| 4,221,697 A * | 9/1980 | Osborn et al. | 524/853 |
| 4,229,328 A * | 10/1980 | Makino et al. | 523/215 |
| 4,562,215 A | 12/1985 | Carter et al. | |
| 4,925,886 A | 5/1990 | Atkins et al. | |
| 5,212,217 A * | 5/1993 | Yukawa et al. | 523/434 |
| 5,281,633 A * | 1/1994 | Okuno et al. | 523/513 |
| 5,690,872 A | 11/1997 | Krieg et al. | |
| 6,028,127 A * | 2/2000 | Yanagase et al. | 523/171 |
| 6,177,499 B1 * | 1/2001 | Minghetti | 524/437 |
| 2002/0129742 A1 | 9/2002 | George | |
| 2005/0096417 A1* | 5/2005 | Quackenbush | 524/284 |

FOREIGN PATENT DOCUMENTS

| | | | |
|---|---|---|---|
| DE | 15 71 428 A | | 12/1970 |
| JP | 63-239052 | * | 10/1988 |
| JP | 1-230625 | * | 9/1989 |
| JP | 2-86642 | * | 3/1990 |
| WO | WO 90/01470 A1 | * | 2/1990 |

OTHER PUBLICATIONS

KR 2003-30306 A (abstract).*
JP 63-239052 (translation in English).*
JP 1-230625 (abstract in English).*

* cited by examiner

*Primary Examiner*—David W. Wu
*Assistant Examiner*—Rip A. Lee

(57) ABSTRACT

A liquid composition which is a precursor to a solid surface material comprises a liquid polymerizable component and two different solid particle distributions with an added polycarboxylic acid or salt retarding or preventing particle settling.

10 Claims, No Drawings

PARTICLE CONTAINING SOLID SURFACE MATERIAL

FIELD OF INVENTION

This invention relates to solid surface materials such as employed in kitchen countertops and wall surfaces.

DESCRIPTION OF RELATED ART

Solid surface materials conventionally contain solid particles embedded in a polymer. Such solid particles are employed to impart properties such as fire retardation or solely for aesthetic considerations.

Buser et al. U.S. Pat. No. 4,085,246 discloses preparation of simulated granite and more particularly simulated granite prepared from acrylic polymers and particular combinations of small and large particles of specified distribution, shape and optical properties.

Minghetti U.S. Pat. No. 6,177,499 discloses preparation of polymethylmethacrylic sheets having a uniform distribution of color both before and after thermoforming.

Atkinson US 2002/0129742 discloses surface treatments for pigments providing improved dispersability and exhibiting biocidal activity employing a composition of a reaction product of a halogenated carboxylic acid, an amine and optionally a fatty acid.

A need exists for solid surface liquid formulations having a large concentration of particles wherein settling of the particles is retarded or preventing prior to solidification of the liquid formulation.

SUMMARY OF THE INVENTION

The present invention is directed to a liquid casting composition which is a precursor to a solid surface material comprising a liquid polymerizable component and solid particles wherein the particles comprise:

(a) first particles having a distribution in the range from 1 micron to 300 microns, and
(b) second particles having a distribution in the range from 0.1 mm to 12 mm;
wherein the casting composition further contains a polycarboxylic acid or salt thereof having at least two carboxylic acid groups and having a molecular weight in a range from 300 grams per mole to 5,000 grams per mole.

Also, the present invention is directed to the resulting solid surface material formed from the liquid coating composition.

DETAILED DESCRIPTION OF THE INVENTION

As employed herein, a solid surface material is employed in its normal meaning and represents a three dimensional material such as a material particularly useful in the building trades for kitchen countertops, sinks and wall coverings wherein both functionality and an attractive appearance are necessary.

Liquid Polymerizable Component

A necessary component of a liquid precursor to the solid surface material is a liquid polymerizable component.

By "liquid" is meant that the material is fluid at room temperature. The liquid polymerizable material may include one or more of the following: (a) at least one monofunctional monomer reactive material; (b) at least one polyfunctional monomer reactive material, and (c) at least one oligomeric reactive material.

Monofunctional monomer reactive material: a "monofunctional monomer reactive material" refers to a compound having one unit of unsaturation capable of taking part in a free radical initiated polymerization reaction, thus becoming incorporated into a polymeric chain. Suitable monofunctional monomer reactive materials can include, for example, monomers having one acrylic group, monomers having one vinyl group, monomers having one allyl group, substituted butadienes or combinations thereof.

A preferred type of monofunctional monomer reactive material is an ester of acrylic or methacrylic acid. The ester is generally derived from an alcohol having 1-20 carbon atoms. The alcohols can be aliphatic, cycloaliphatic or aromatic. The ester may also be substituted with groups including, but not limited to, hydroxyl, halogen, and nitro. Representative (meth)acrylate esters include methyl (meth)acrylate, ethyl (meth)acrylate, butyl (meth)acrylate, 2-ethylhexyl (meth)acrylate, glycidyl(meth)acrylate, cyclohexo (meth)acrylate, isobornyl(meth)acrylate, siloxane(meth)acrylates, and the like. Acrylic and methacrylic acid can also be used. Most preferred is methylmethacrylate and copolymers thereof.

Examples of monofunctional monomer materials including one "vinyl group" include acrylonitrile, methacrylonitrile, and vinyl acetate.

Polyfunctional monomer reactive material: a "polyfunctional monomer reactive material" refers to a monomeric compound having multiple units of unsaturation which can take part in free radical initiated polymerization reactions, thus becoming incorporated into two or more polymeric chains. By the nature of the resulting structure, such a reaction is referred to as "crosslinking" in which two or more polymeric chains are joined by the polyfunctional monomer reactive material. As such, polyfunctional monomer reactive materials are often referred to as crosslinking agents.

The reactive group can be one that copolymerizes with the liquid polymerizable material, such as a polymerizable ethylenically unsaturated group. The reactive group can also be one that reacts with a side chain or residue of the liquid polymerizable material after polymerization, such as a hydroxyl, carboxyl, isocyanate or epoxy group. The reaction of the multifunctional reactive material forms a crosslinked network with the liquid polymerizable material.

A preferred class of crosslinking agents is the (meth)acrylate esters of polyols. Some representative examples include ethylene glycol di(meth)acrylate, neopentyl glycol di(meth)acrylate, hexanediol di(meth)acrylate, trimethylolpropane tri(meth)acrylate, pentaerythritol tri(meth)acrylate, dipentaerythritol tetra(meth)acrylate, and the like. Other suitable types of crosslinking agents include divinyl compounds, such as divinyl ethers, allyl(meth)acrylate, urethane di- and poly-(meth)acrylates.

Oligomeric reactive material: an "oligomeric reactive material" refers to an oligomeric, low molecular weight chain having one or more units of reactivity, such as ethylenic unsaturation, that can take part in free radical initiated polymerization reactions, thus becoming incorporated into a polymeric material. Oligomeric reactive materials can include oligomers of any of the (a) and/or (b) monomers described above; urethane(meth)acrylates formed by (meth)acrylic functionalization of urethane oligomers or by in situ reaction of oligomeric isocyanates with (meth)acrylic residues; (meth)acrylate functionalized unsaturated polyester oligomers and resins; epoxy(meth)acrylates, such as the mono- and di(meth)acrylates of bisphenol A epoxy resins; and combinations thereof. Preferably, the oligomeric reactive material is incorporated into the polymerized material making up the cast article during the curing process. Alternative reactive groups can be vinyl, allyl, and the like. Reactive groups can be pendant to or in the main chain of the polymer.

It is understood that oligomeric reactive materials having more than one reactive group can also function as crosslinking agents.

It will be appreciated that the choice of reactive materials making up the liquid polymerizable fraction will depend to some extent on the desired properties of the final cast article. For example, if adhesion to a hydrophilic filler or substrate is desired, an acrylic material with acid or hydroxyl groups can be used. For flexibility, (meth)acrylates with lower glass transition temperature, $T_g$, such as butyl acrylate, can be used. For thermal stability, it is preferred that acrylates be used in combination with methacrylates. For enhanced hardness, it is preferred that high $T_g$ (meth)acrylate functional oligomer be used.

Polymer Component

The casting compositions of the present invention optionally include at least one non-crosslinked resin polymer. Non-crosslinked resin polymers of the present invention can be reactive, nonreactive or a combination thereof. A non-crosslinked resin polymer is "reactive" when the polymer physically associates or chemically reacts with any other component(s) in the casting composition.

The term "non-crosslinked" as used herein refers to polymers that are linear, branched, blocked or combinations thereof, that, as a starting material prior to introduction to the molding composition have chains without linkages between the chains. The non-crosslinked polymer can either be soluble or insoluble in the liquid polymerizable material. It is preferred that the non-crosslinked polymer is soluble in the liquid polymerizable material. The combination of the soluble non-crosslinked polymer dissolved in the liquid polymerizable material is generally referred to as a "sirup". Suitable polymers include, are but not limited to, homopolymers and copolymers made from any of the monomers or oligomers listed above as liquid polymerizable material.

The primary use of the non-crosslinked polymer fraction is as a rheology modifier for the casting composition, particularly when soluble in the liquid polymerizable fraction. In addition, the non-crosslinked polymer fraction can also contribute to the performance and/or aesthetics of the final cast article and can reduce the amount of liquid polymerizable fraction required.

Polycarboxylic Acid or Salt

The necessary component in the present invention to retard or prevent settling of solid particles is a polycarboxylic acid or salt thereof having at least two carboxylic acid groups and having a molecular weight in a range from 300 grams per mole to 5,000 grams per mole. A preferred range is 300 grams per mole to 1000 grams per mole.

Commercially available examples of such polycarboxylic acids or salts include, but are not limited to BYK®-P 104, BYK®-P 104S, BYK®-P105 (available from BYK Chemie USA Incorporated, Wallingford, Conn.), Bermawet Antifloat S (available from Bergen Materials Corp., Elfers, Fla.), Efka 5065 and Efka 5061 (available from EFKA Additives USA, Stow, Ohio). Illustratively, BYK®P-104 is a solution of a lower molecular weight unsaturated polycarboxylic acid polymer; BYK®-104S is with a polysiloxane polymer while BYK®-P-105 is a solvent free version of BYK®-P-104. Efka 5065 is a high molecular weight unsaturated carboxylic acid with a compatible organically modified polysiloxane and Efka 5071 is an alkylol ammonium salt of a high molecular weight carboxylic acid.

Without being bound to any theory it is considered that the polycarboxylic acid or salt provides controlled flocculation of particles by creating a three dimensional network that is easily broken under shear. This network is considered to build up a low shear rate viscosity such the particles settle slowly. Accordingly, in the time period in which solidification of the liquid formulation occurs, little or no particle settling is observed.

Although it is necessary for the polycarboxylic acid or salt to be present, the amount of such acid or salt can vary within wide limits. One variable which can affect the amount of acid or salt would include the time necessary for formation of the solid surface material. If the cure time is short, less acid or salt is necessary since minimum settling will occur. Other variables include the size, weight and concentration of the solid particles. Heavier particles in the starting liquid formulation are considered to require large concentrations of the polycarboxylic acid or salt. However, a person in this art can readily determine any optimum amount based on a knowledge of employing the acid or salt. A typical concentration of carboxylic acid or salt of a liquid polymerizable component is in a range from 0.1 to 1.0 percent by weight, more preferably 0.125 percent by weight.

Particles

In the present invention, particles are present in two different size distributions. It is considered that the benefits of the present in retarding or reducing particulate settling do not occur to the desired degree if only a single particle size distribution is present.

A first particle size distribution is in a range from 1 micron to 300 microns, more preferably 1 to 100, and most preferably 10 to 50 microns.

A second particle size distribution is in the range from 0.1 mm to 12 mm, more preferably 0.1 to 5 mm and most preferably 3 to 5 mm.

The concentration of the first and second particle size distribution can vary within wide ranges. Illustratively, the first particle size distribution may be present in an amount of 10 to 70 weight percent based on the total composition volume, more preferably 30 to 65 weight percent and most preferably 40 to 60 weight percent. Illustratively, the second particle size distribution may be present in an amount of 1 to 50 weight percent based on the total composition weight, more preferably 3 to 40 weight percent and most preferably 5 to 30 weight percent. It is understood that the liquid polymerizable component will be present in a sufficient amount to act as a binder for all particles.

Additionally, it is understood that particle may, and typically will, be present which lie outside the standard particle size distribution ranges.

The composition of the first smaller particles illustratively include mineral fillers. Some representative mineral fillers include alumina, alumina trihydrate (ATH), alumina monohydrate, Bayer hydrate, silica including sand or glass, glass spheres, magnesium hydroxide, calcium sulfate, calcium carbonate, barium sulfate, and ceramic particles. ATH, alumina monohydrate, magnesium hydroxide, and calcium carbonate are known to have fire retardant properties.

The second larger particles typically are added for aesthetic reasons, i.e. to impart a pleasing surface appearance to the final article. Illustrative particles can be colored or uncolored, opaque, translucent, or transparent. Typical mineral particles that can be used are calcined talc, magnetite, siderite, ilmenite, goethite, galena, graphite, anthracite and bituminous coal, chalcopyrite, pyrite, hematite, limonite; pyroxenes such as augite; amphiboles such as hornblende, biotite, sphalerite, anatase, corunbum, diamond, carborundum, anhydrite, chalk, diurite, rutile, sandstone, shale, slate, sparite, vermiculite, natural granite, peat and basalt. Other useful materials are chips of brick, charcoal, concrete, plaster, porcelain, sawdust, seashells, slag, wood and the like. Commonly employed macroscopic decorative particles known to the industry as "crunchies" are various filled and unfilled, pigmented or dyed, insoluble or crosslinked chips of polymers such as ABS resins, cellulose esters, cellulose ethers, epoxy resins, polyethylene, ethylene copolymers, melamine resins, phenolic resins, polyacetals, polyacrylics, polydienes, polyesters, polyisobutylenes, polypropylenes, polystyrenes, urea/formaldehyde resins, polyureas, polyurethanes, polyvinyl chloride, polyvinylidene chloride, polyvinyl esters and the like. Other useful macroscopic translucent and transparent decorative particles are natural or synthetic minerals or materials such as agate, alabaster, albite, calcite, chalcedony, chert, feldspar, flint quartz, glass, malachite, marble, mica, obsidian, opal, quartz, quartzite, rock gypsum, sand, silica, travertine, wollastonite and the like; cloth, natural and synthetic fibers; and pieces of metal.

In the preceding discussion of the first and second particle size distributions, it is understood that the same particle component can be used for both the first and second particles. However, conventionally the particle composition will differ. Illustratively, the reason to add smaller particles may be to add fire retardancy to the overall composition while large particles are present for surface aesthetics.

As previously set forth it is understood that particles outside the disclosed distribution may and conventionally can be expected to be present.

Other Components

The liquid casting composition typically will contain additional components such as cure agents, pigments and other additives.

Cure agents, when activated, generate free radicals which then initiate the desired polymerization reactions. Either a chemically-activated thermal initiation or a purely temperature-driven thermal initiation to cure the acrylic polymerizable fraction may be employed herein. Both cure systems are well-known in the art. In the embodiment of the examples, a chemically-activated thermal initiation cure is employed.

Pigments such as iron oxides, zinc sulfide, zinc oxide, and titanium dioxide are routinely utilized in solid surface applications to achieve the desired color and aesthetics. These may be added in the form of liquid dispersions or pastes or as neat, milled solids depending upon the needs of the particular system.

Other ingredients are included in the casting compositions to enhance physical performance, improve processability, or adjust visual aesthetics. Examples of such additives include the addition of adhesion promoting agents to increase adhesion between the filler and the polymerizing fraction. Impact modifiers, for example, elastomeric polymers such as graft copolymers of methyl methacrylate, styrene, and butadiene, copolymers of butyl acrylate and methyl acrylate or other well-known impact modifiers can be added to improve impact strength. Flame retardant additives such as brominated organics can be incorporated. Other flame retardants include carbon fiber and aramid fiber.

In the following examples all percentages and parts are by weight unless otherwise indicated.

In each of the examples the following components listed in the Table were employed. All percentages are by weight unless otherwise indicated.

TABLE

| Component | Weight |
|---|---|
| Methyl methacrylate, unsaturated monomer | 33.62 g |
| 24% PMMA polymer in MMA, dissolved polymer sirup | 302.54 g |
| aluminum trihydroxide, inorganic filler | 510 g |
| white chips of polyacrylic, decorative particles | 150 g |
| trimethylolpropane trimethacrylate, crosslinker | 1.41 g |
| Vazo ® 67, initiator | 0.21 g |
| Lupersol 10M75, initiator | 1.05 g |
| Penn Color 9S172, 50% in MMA, pigment | 0.20 g |
| Penn Color 9S138, 50% in MMA, pigment | 0.20 g | g means grams.
MMA means methyl methacrylate.
PMMA means polymethyl methacrylate with an average molecular weight in a range from 25,000 to 40,000.

Aluminum trihydrate particle size was in a range from 1 to 100 microns.

White chips particle size was in a range from 0.1 to 5 mm.

EXAMPLE 1

(Control)

The components listed in the Table were added to a reaction kettle and mixed with a high-speed dispersion blade for four minutes under vacuum. The resulting mix was poured into a 1 liter graduated cylinder. A thermocouple was placed in the mix and the graduated cylinder was submerged into a 60° C. water bath. The reaction temperature was monitored until the reaction was complete, approximately 1 hr. The sample was easily removed from the graduated cylinder upon cooling and was cut lengthwise to observe particle settling. Almost all, i.e., more than 95% of individual particles were concentrated in approximately one-third of the lengthwise sections of the resulting article. Less than 5% of individual particles were randomly present in the remaining two-thirds portion of the lengthwise section.

EXAMPLE 2

The components listed in the Table along with 5 g of Byk®-P105 (70% by weight lower molecular weight carboxylic acid polymer in n-butyl methacrylate) were added to a reaction kettle and mixed with a high-speed dispersion blade for four minutes under vacuum. The resulting mix was poured into a 1 liter graduated cylinder. A thermocouple was placed in the mix and the graduated cylinder was submerged into a 60° C. water bath. The reaction temperature was monitored until the reaction was complete, approximately 1 hr. The sample was easily removed from the graduated cylinder upon cooling and was cut lengthwise to observe whether particle settling took place. The lengthwise section showed, at most, a small amount of settling took place with uniformity present.

EXAMPLE 3

The components listed in the Table along with 5 g of Efka® 5071 (51-55% alkylol ammonium salt of carboxylic acid) were added to a reaction kettle and mixed with a high-speed dispersion blade for four minutes under vacuum.

The resulting mix was poured into a 1 liter graduated cylinder. A thermocouple was placed in the mix and the graduated cylinder was submerged into a 60° C. water bath. The reaction temperature was monitored until the reaction was complete, approximately 1 hr. The sample was easily removed from the graduated cylinder upon cooling and was cut lengthwise to observe whether particle settling took place. The lengthwise section showed, at most, a small amount of settling took place with uniformity present.

EXAMPLE 4

The components listed in the Table along with 5 g of Efka® 5065 (50-54% unsaturated carboxylic acid combined with organically modified polysiloxane in alkylbenzene/diisobutylketone.) were added to a reaction kettle and mixed with a high-speed dispersion blade for four minutes under vacuum. The resulting mix was poured into a 1 liter graduated cylinder. A thermocouple was placed in the mix and the graduated cylinder was submerged into a 60° C. water bath. The reaction temperature was monitored until the reaction was complete, approximately 1 hr. The sample was easily removed from the graduated cylinder upon cooling and was cut lengthwise to observe whether particle settling took place. The lengthwise section showed, at most, a small amount of settling took place with uniformity present.

What is claimed is:

1. A liquid casting composition which is a precursor to a solid surface material comprising a liquid polymerizable component, polycarboxylic acid or salt thereof having at least two carboxylic acid groups and having a molecular weight in a range from 300 grams per mole to 5,000 grams per mole, and solid particles wherein the particles comprise:
   (a) first particles having a distribution in the range from 1 micron to 100 microns, and
   (b) second particles having a distribution in the range from 3 mm to 5 mm wherein the first particles are mineral and wherein the second particles are selected from the group consisting of mineral and polymer, and
   wherein the composition contains an ester of acrylic or methacrylic acid.

2. The composition of claim 1 wherein said molecular weight is in a range from 300 grams per mole to 1000 grams per mole.

3. The composition of claim 1 wherein the concentration of the polycarboxylic acid or salt is in a range from 0.1 to 1.0 weight percent of the liquid polymerizable component.

4. The composition of claim 1 which contains a non-crosslinked polymer.

5. The composition of claim 1 wherein based on the total weight of the composition, the first particles are present in an amount from 10 to 70 weight percent based on total compositional volume, and the second particles are present in an amount from 1 to 50 weight percent based on total compositional weight.

6. The composition of claim 5 wherein the first particles are present in an amount from 30 to 65 weight percent and the second particles are present in an amount from 3 to 40 weight percent.

7. A solid composition formed from the liquid coating composition of claim 1.

8. A liquid casting composition which is precursor to a solid surface material comprising a liquid polymerizable component, polycarboxylic acid or salt thereof having at least two carboxylic acid groups and having a molecular weight in a range from 300 grams per mole to 5,000 grams per mole, and solid particles wherein the particles comprise:
   (a) first particles having a distribution in the range from 1 micron to 100 microns, and
   (b) second particles having a distribution in the range from 3 mm to 5 mm
   wherein the first particles are mineral and wherein the second particles are selected from the group consisting of mineral and polymer,
   wherein the first particles are selected from the group consisting of aluminum trihydrate, aluminum monohydrate, magnesium hydroxide, and calcium carbonate.

9. The composition of claim 8 wherein the second particles are polymer.

10. A liquid casting composition which is a precursor to a solid surface material comprising a liquid polymerizable component, polycarboxylic acid or salt thereof having at least two carboxylic acid groups and having a molecular weight in a range from 300 grams per mole to 5,000 grams per mole, and solid particles wherein the particles comprise:
    (a) first particles having a distribution in the range from 1 micron to 100 microns, and
    (b) second particles having a distribution in the range from 3 mm to 5 mm
    wherein the first particles are mineral and,
    wherein the second particles are polymer.

* * * * *